(12) United States Patent
Marcu et al.

(10) Patent No.: US 8,390,644 B2
(45) Date of Patent: Mar. 5, 2013

(54) METHODS AND APPARATUS FOR COLOR UNIFORMITY

(75) Inventors: Gabriel Gheorghe Marcu, San Jose, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/619,940

(22) Filed: Sep. 14, 2012

(65) Prior Publication Data

US 2013/0010012 A1 Jan. 10, 2013

Related U.S. Application Data

(63) Continuation of application No. 12/209,135, filed on Sep. 11, 2008, now Pat. No. 8,289,344.

(51) Int. Cl.
| | |
|---|---|
| *G09G 5/00* | (2006.01) |
| *G09G 5/02* | (2006.01) |
| *G06K 9/40* | (2006.01) |
| *G06K 9/32* | (2006.01) |
| *G06K 9/00* | (2006.01) |
| *H04N 5/00* | (2006.01) |
| *H04N 5/14* | (2006.01) |
| *H04N 5/46* | (2006.01) |
| *H04N 1/60* | (2006.01) |
| *H04N 5/202* | (2006.01) |
| *G03F 3/08* | (2006.01) |

(52) U.S. Cl. ........ 345/590; 345/581; 345/600; 345/606; 345/1.1; 348/557; 348/612; 348/671; 348/254; 358/1.9; 358/518; 358/519; 358/525; 382/162; 382/254; 382/274; 382/300

(58) Field of Classification Search .............. 345/581, 345/589, 590, 606, 1.1, 3.1, 690, 547–549, 345/593, 600–601; 348/557, 612, 671, 253–254, 348/256, 268, 552, 560, 577–578, 596–599, 348/630–631, 663, 674; 358/1.9, 518–519, 358/523, 520, 525, 447–448, 453; 382/162, 382/254, 274, 300, 163–167, 276, 302, 307, 382/312

See application file for complete search history.

(56) References Cited

U.S. PATENT DOCUMENTS

| | | | | |
|---|---|---|---|---|
| 7,362,336 | B2 * | 4/2008 | Miller et al. | 345/589 |
| 8,289,344 | B2 * | 10/2012 | Marcu et al. | 345/590 |
| 2006/0152524 | A1 * | 7/2006 | Miller et al. | 345/589 |
| 2007/0052735 | A1 * | 3/2007 | Chou | 345/690 |
| 2007/0257944 | A1 * | 11/2007 | Miller et al. | 345/694 |
| 2010/0194753 | A1 * | 8/2010 | Robotham et al. | 345/428 |

* cited by examiner

*Primary Examiner* — Wesner Sajous
(74) *Attorney, Agent, or Firm* — Wong, Cabello, Lutsch, Rutherford and Brucculeri, LLP

(57) ABSTRACT

Methods and apparatus for achieving color and luminance uniformity in color output devices. In one embodiment, measurements of luminance and chrominance are taken at various regions of the display surface for a range of color inputs. Using the collected data, a color volume is formed for each of the measured regions. This color volume comprises a set of all colors producible at the measured region. The color volumes for each of the measured regions are then used to generate a common color gamut, i.e., a volume of colors that are producible in each of the measured regions. A gamut mapping can then be performed for all or a portion of the positions on the display surface to a target color gamut. Input data for the gamut mapping process may be determined by conventional interpolative techniques.

13 Claims, 4 Drawing Sheets

METHODS AND APPARATUS FOR COLOR UNIFORMITY

This is a continuation application which claims priority to U.S. patent application Ser. No. 12/209,135 filed Sep. 11, 2008, entitled "Methods and Apparatus for Color Uniformity" which is hereby incorporated by reference.

BACKGROUND

The present invention relates generally to the field of color correction. More particularly, the present invention is directed in one exemplary aspect to achieving color uniformity in color output devices.

In devices capable of color output (e.g., computer monitors, projectors, printers, etc.), the color output depends upon the input signal. Thus, in an ideal device, if the input signal corresponds to a constant color, then the color output should be constant.

In practice, however, the color output is not simply a function of the input signal, but may also depend upon physical characteristics of the device as well (e.g., the distance that light has to travel to reach a target position on the display surface, physical characteristics of the display surface, angles of reflection, mechanical components of a print head or display structure, electromagnetic properties, etc.). These physical characteristics can often result in a constant input signal being displayed differently in different regions of the display surface.

This phenomenon causes unintended distortions in the colors of images. For example, if a computer monitor is to have a solid blue background, it may set each pixel of the display to utilize the same color input. However, physical characteristics of the monitor may cause certain positions of the display surface to be presented in a lighter shade of blue, while other positions are presented in a darker shade. Moreover, the displayed shade of blue may exhibit a shift in hue or saturation. Therefore, a need exists to achieve color uniformity in color output devices.

SUMMARY

The present invention is directed in one exemplary aspect to achieving color and luminance uniformity in color output devices. In one embodiment, measurements of luminance and chrominance are taken at various regions of the display surface for a range of color inputs. Using the collected data, a color volume is formed for each of the measured regions. This color volume comprises a set of all colors producible at the measured region. The color volumes for each of the measured regions are then used to generate a common color gamut, i.e., a volume of colors that are producible in each of the measured regions. A gamut mapping can then be performed for all or a portion of the positions on the display surface to a target color gamut. Input data for the gamut mapping process may be determined by conventional interpolative techniques.

DETAILED DESCRIPTION

Figure 1:
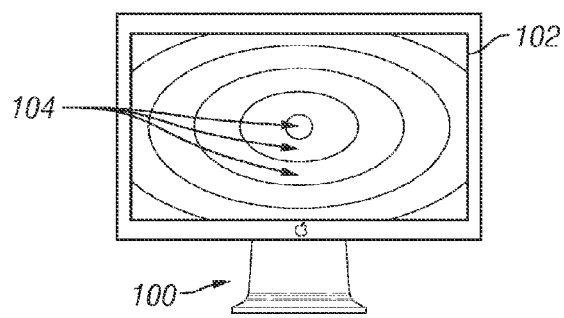
FIG. 1 is an illustration of a conventional color output device exhibiting non-uniform color output.

In the following description of exemplary embodiments, reference is made to the accompanying drawings which form a part hereof, and in which it is shown by way of example specific embodiments in which the invention may be practiced. It is to be understood that other embodiments may be utilized and structural changes may be made without departing from the scope of the present invention.

As used herein, the term "application" includes without limitation any unit of executable software which implements a specific functionality or theme. The unit of executable software may run in a predetermined environment; for example, a downloadable Java Xlet™ that runs within the JavaTV™ environment.

As used herein, the term "color output device" refers to any device capable of outputting color upon one or more display surfaces. This includes, without limitation, televisions, monitors, electronic displays, cameras, personal data assistants, arcade and home console systems, computers, projectors, video display equipment, and printers.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, Matlab, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices also include less dynamic devices such as printers, e-ink devices, and other similar structures.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As user herein, the term "module" refers to any unit or combination of units incorporating software, firmware, hardware, or any combination thereof that is designed and configured to perform a desired function.

As used herein, the terms "processor," "microprocessor," and "digital processor" include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die or distributed across multiple components.

Although embodiments of the present invention are described herein in terms of 8-bit color input sequences, it should be understood that the present invention is not limited to 8-bit color input sequences, but is generally applicable to color input sequences of any length. Furthermore, although embodiments of the present invention are described herein in terms of computerized display screens, it should be understood that the present invention is not limited to computerized display screens, but is also applicable to a wide range of other color output devices. This includes, without limitation, televisions, monitors, electronic displays, cameras, personal data assistants, arcade and home console systems, computers, projectors, video display equipment, and printers.

FIG. 1 is an illustration of a conventional color output device 100 exhibiting non-uniform color output. The color output device 100 comprises a display surface 102 adapted to output images during normal operation. The output for each pixel of a displayed image is controlled by varying levels of red, green, and blue (or alternatively, by varying levels of cyan, magenta, yellow, and black) in the color output device 100.

For example, if 24 bits are used to represent red, green, and blue (i.e., 8 bits per each color), then red, green, and blue may each vary in 256 different levels ($2^8$=256). Thus, the input for white may obtained by the bit sequence (255, 255, 255), the input for green (0, 255, 0), and the input for black (0, 0, 0).

In an ideal system, the color output on the display surface 102 would match the input signal, irrespective of the region of the display surface 102. In practice, however, color output is often adversely affected by a number of physical characteristics of the color output device (e.g., the distance that light has to travel to reach a target position on the display surface, physical characteristics of the display surface, angles of reflection, mechanical components of a print head or display structure, electromagnetic properties, etc.).

These physical characteristics can cause the same color input sequence to be output differently at various regions 104 of the display surface 102. In many cases, a specific color sequence that could be output in one region 104 of the display cannot be reproduced in another region 104. For example, in many monitors and display devices, the range of reproducible colors is largest in the center of the display, but attenuates toward the edges. In other color output devices (printers, projectors, etc.) the relationship between output and the position on the display surface may be different.

Without correcting for color uniformity, output on the display surface 102 may appear distorted or glossy. Unintentional color gradients and color aberrations may also develop in images comprising a large quantity of a common color. Embodiments of the present invention therefore correct for this non-uniformity, advantageously enabling true colors of an image to be preserved.

Figure 2:
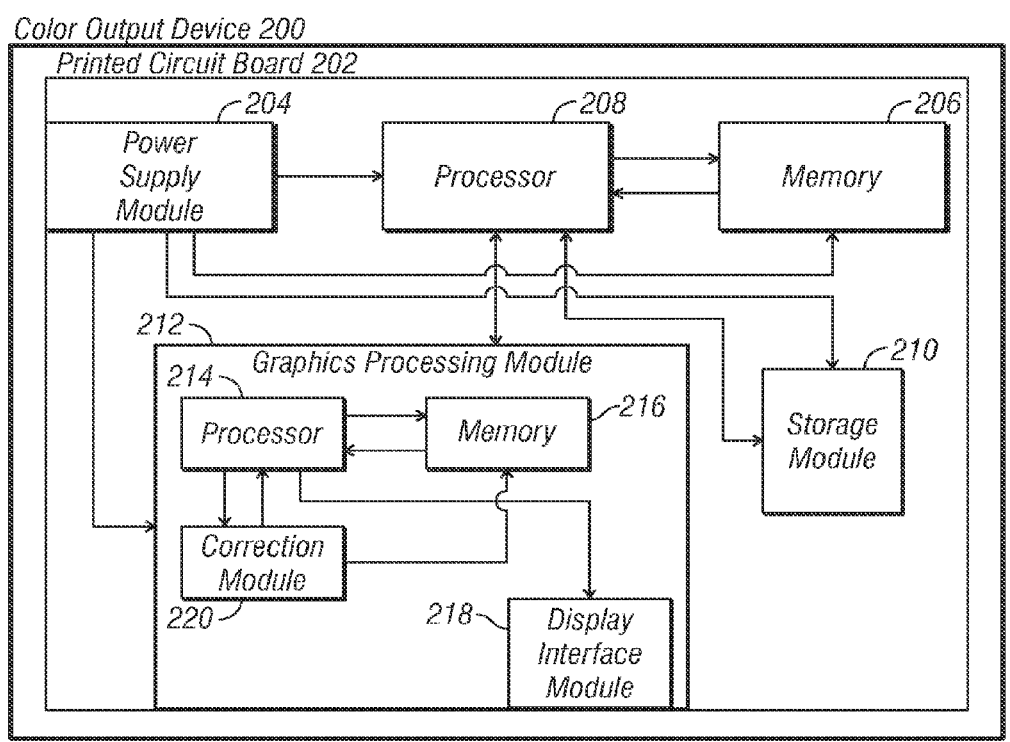
FIG. 2 is a system diagram of an exemplary color output device comprising a correction module according to one embodiment of the present invention.

FIG. 2 is a system diagram of an exemplary color output device 200 comprising a correction module 220 according to one embodiment of the present invention. As shown by the figure, the color output device 200 houses a printed circuit board 202 enabling communication and data transfer between the connected modules.

Note that while FIG. 2 depicts the color output device 200 as a computer, the color output device 200 may comprise a wide range of electronic and mechanical devices according to embodiments of the present invention. This includes, without limitation, televisions, monitors, electronic displays, cameras, personal data assistants, arcade and home console systems, computers, projectors, video display equipment, and printers.

A power supply module 204 provides a source of power to modules electrically connected to the punted circuit board 202. In some embodiments, power is supplied externally by one or more conductive wires, for example, from a power cable or a serial bus cable. In other embodiments, a battery may be used as a source of power.

A memory 206 comprises any type of module adapted to enable digital information to be stored, retained, and retrieved. Additionally, the memory 206 may comprise any combination of volatile and non-volatile storage devices, including without limitation RAM, DRAM, SRAM, ROM, and/or flash memory. Note also that the memory 312 may be organized in any number of architectural configurations utilizing, for example, registers, memory caches, data buffers, main memory, mass storage, and/or removable media.

One or more processors 208 are adapted to execute sequences of instructions by loading and storing data to the memory 206. Possible instructions include, without limitation, instructions for data conversions, formatting operations, communication instructions, and/or storage and retrieval operations. Additionally, the processors 208 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 208 may be contained on a single unitary IC die or distributed across multiple components.

A storage module 210 comprises any non-volatile storage device adapted to store digitally encoded data. The storage module may comprise one or more hard disks adapted to be accessed over any number of interfaces, including, without limitation, Serial Advanced Technology Attachment (SATA), Integrated Drive Electronics (IDE), Small Computer System Interface (SCSI), FireWire (IEEE 1394), or Universal Serial Bus (USB) interfaces. In one embodiment, the storage module is adapted to store mapping data associated with the correction module 220 (discussed later).

A graphics processing module 212 is adapted to generate and output images to a display screen (not shown). The graphics processing module 212 may be a dedicated expansion card (such as a video card, display adapter, or graphics acceleration card) that is plugged into a slot on the printed circuit board 202, or a graphics controller integrated within the printed circuit board 202. Additionally, the graphics processing module 212 may comprise a dedicated processor 214 and memory 216.

The graphics processing module 212 interfaces with a display screen via a display interface module 218, which may contain logic for driving the display. In some embodiments, the display screen is disposed within the color output device 200, but the display screen may alternatively be connected to the graphics processing module 212 via a cable or other physical connector.

A correction module 220 is adapted to supply the necessary display corrections for one or more regions within the associated display screen. Note that while the correction module is illustrated in FIG. 2 as being disposed within the graphics processing module 212, all or a portion of the correction module 212 may be disposed within another device or module (e.g., integrated within the printed circuit board 202, part of a stand-alone display device, software resident in the memory 206, etc.). The processes used for accomplishing color correction are now described below.

Figure 3:
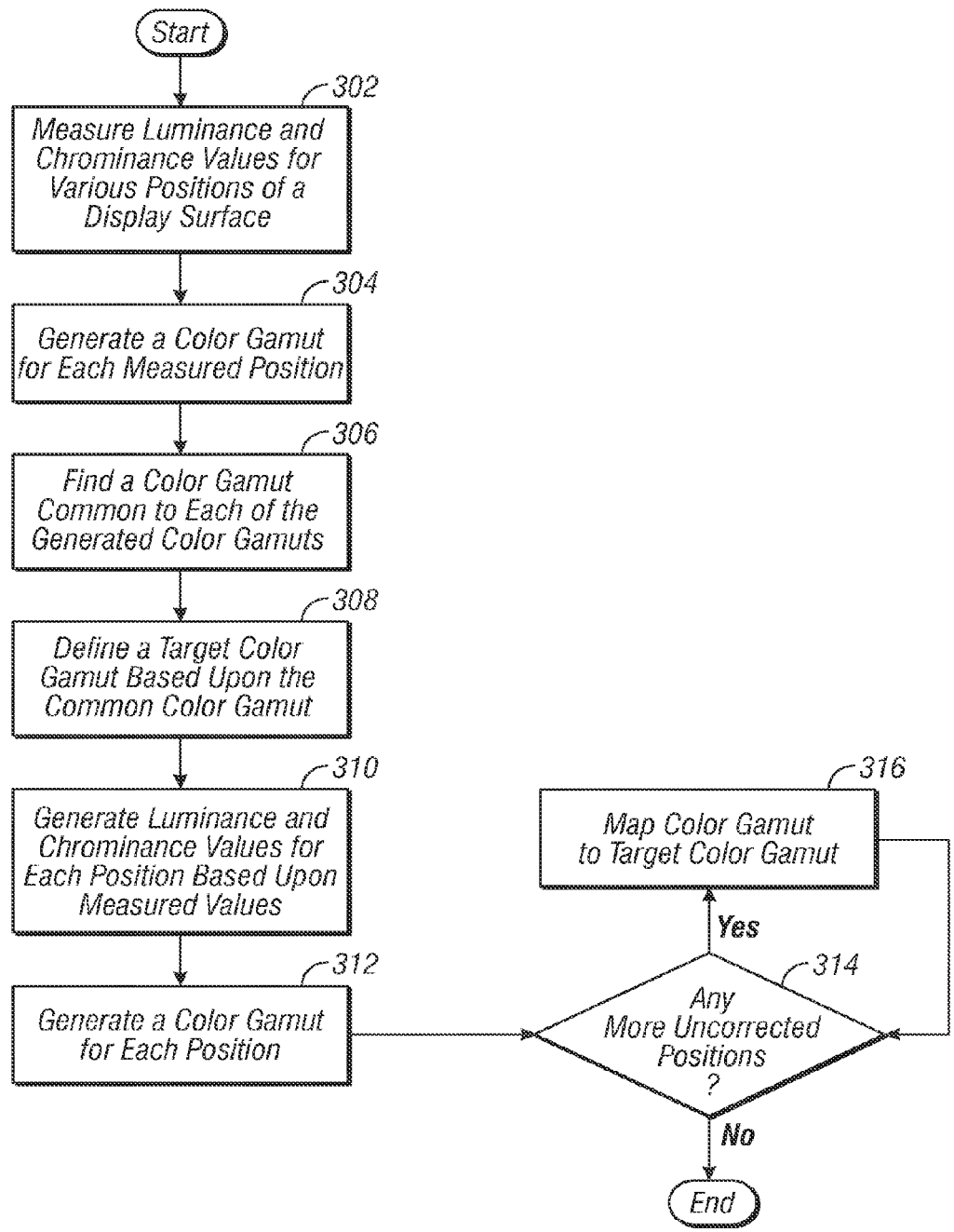
FIG. 3 is a flow diagram illustrating an exemplary method of achieving color and luminance uniformity according to one embodiment of the present invention.

FIG. 3 is a flow diagram illustrating an exemplary method of achieving color and luminance uniformity according to one embodiment of the present invention. Luminance (represented here as "Y") refers to the intensity or brightness in an image, and thus defines the achromatic portion of an image. Chrominance refers to the signal used to carry color information of an image separately from the accompanying luminance signal. Chrominance is usually represented as two components, "x" and "y."

At block 302, luminance and chrominance values are measured for various regions of a display surface. These regions may be defined in various ways according to embodiments of the present invention.

For example, in one embodiment, M points on a display screen are divided into a two-dimensional lattice of (n+1)×(m+1) positions, where m and n are even numbers so that there is a position in the center of the display surface. Note that the positions need not necessarily be equidistant, for example, the vertical spacing between adjacent positions may be different than the horizontal spacing according to some embodiments.

In other embodiments, all or a portion of the display screen may be split into a number of disjunct triangles. This technique may be utilized, for example, when the uniformity correction requires more measurements in a certain region of the screen (i.e., to increase the accuracy of the uniformity correction). Conventional techniques in triangulation (e.g., Delaunay triangulation) may be used to split up the screen in this manner. In one embodiment, after the display screen is partitioned into disjunct triangles covering the entire display surface, one position can belong to only one triangle.

A device capable of measuring luminance Y and chrominance (x,y) values is then used upon designated regions of the display surface. Many different types of devices may be used for this purpose, including, for example, colorimeters or spectroradiometers. In one embodiment, the measuring instrument targets each designated region of the display, and luminance Y and chrominance values (x,y) are then recorded for a set of input color combinations.

Figure 4:
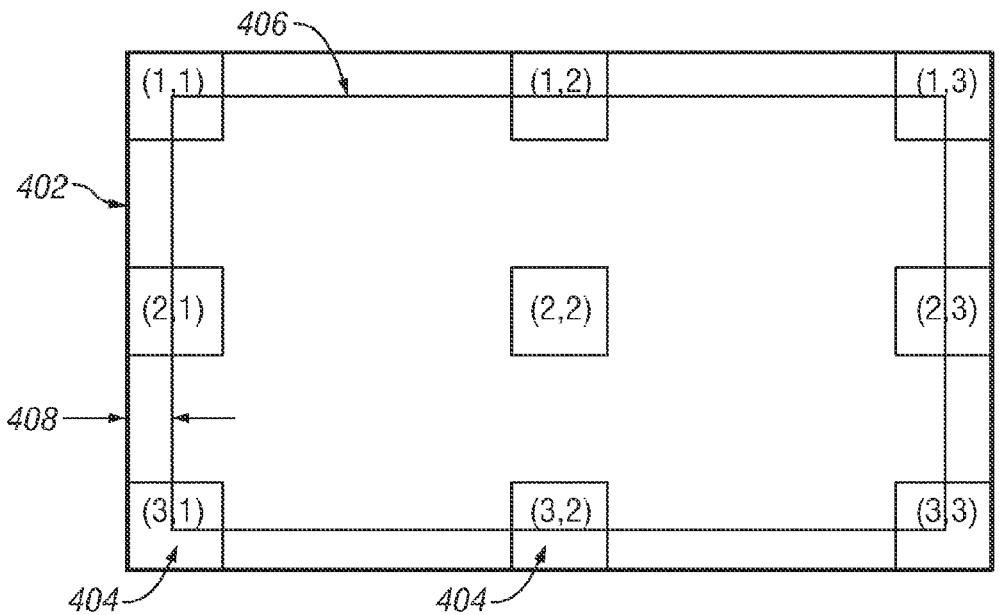
FIG. 4 is an illustration of an exemplary measurement process according to one embodiment of the present invention.

FIG. 4 is an illustration of an exemplary measurement process according to one embodiment of the present invention. As shown by the figure, the display screen 402 has been divided into a two-dimensional lattice of M=9 positions (where n=2 and m=2, thus forming a (n+1)×(m+1)=3×3 regulate grid). Each position 404 has been assigned a set of coordinates in (row, column) format.

Initially, the measuring device targets the first position 404 on the display screen 402 (i.e., position (1,1)). Luminance Y and chrominance (x,y) values are then recorded for a set of input color combinations. For example, if black, white, red, green, and blue are the only values necessary for the given display model, the Y and (x,y) values are taken for color inputs (0,0,0), (255,255,255), (255,0,0), (0, 255, 0), and (0,0, 255), respectively. The measuring device then targets the next position 404, and the process repeats until a set of measurements has been taken for all positions 404.

In one embodiment, the measurements taken at each region are assigned to a point at the center of each region. For greater accuracy, the size of each of the measured regions is kept small. A rectangle 406 formed from the centers of each region situated at the edges of the display screen 402 defines an area of interpolation (i.e., an area of points in which luminance Y and chrominance (x,y) values may be estimated based upon measurements taken at positions 404). Beyond the area delimited by the rectangle 406, i.e. within the border region 408, no interpolated data exists. In order to avoid noticeable errors, the correction data for points on the edge of the rectangle 406 may be repeated for each point disposed within the border region 408 according to one embodiment of the present invention. In other embodiments, the missing data may be extrapolated based upon one or more functions generated by the interpolation process.

In some embodiments, a device is used which can determine luminance and chrominance values by taking a snapshot or a picture of the entire display screen 402, as opposed to merely a single region 404. The device may comprise a color calibrated camera or other component adapted to accurately measure luminance and chrominance values from the captured image. In one embodiment, the luminance and chrominance values for a particular color input sequence can be determined for all points on the display screen 402 based upon a single snapshot.

After the regions have been defined, the luminance and chrominance values are measured for a number of color input sequences. The number and variation of color input sequences depends upon the display model being utilized and/or the amount of accuracy desired in the color correction. If the display model is known beforehand, fewer samples may be required to achieve an accurate color correction.

For example, the matrix and gamma model assumes that the device is color additive, that there is no cross correlation between color channels, and that color transformation from a red-green-blue (ROB) space to an independent color space can be reliably computed with matrix multiplication and lookup tables. For this model, five color input sequences are used (i.e., white, black, red, green, and blue) plus an additional sequence to determine the gamma value. In one embodiment, the sequence to determine gamma may be taken as a number of samples distributed in each of the RGB range (e.g., (127, 127, 127)) in order to minimize the error in estimation.

If the display model is not known, a lookup table (LUT) model may be used in the alternative. The LUT model does not assume any behavior of the display device. In general, any number of samples may be taken with the LUT model, but the higher the number of samples, the higher the accuracy in the color and luminance correction. For example, in a 5×5×5 sampling scheme, the level of each RGB color may be divided into five values, where the distance between each value is roughly equal (e.g., 0, 63, 127, 191, and 255). In this example, the number of samples to be taken is equal to $5^3$=125. However, if a greater degree of accuracy is required, a higher number of samples may be taken according to embodiments of the present invention.

Referring again to FIG. 3, after the luminance and chrominance values for a display surface have been taken for each color input sequence, a color volume is then generated for each measured position. This color volume represents the range of all colors producible at the measured positioned, and is referred to herein as a "color gamut." Generating a color gamut for each measured position is depicted in FIG. 3 at block 304.

In some embodiments, the recorded Y, (x,y) values corresponding to each color input sequence are first converted into a different color space before the color gamuts are generated. In one embodiment, each set of values is converted into CIELAB format (i.e. L*a*b*), but other color spaces may also be utilized according to embodiments of the present invention. These color spaces include, without limitation, CIELUV, IPT, or color spaces based upon Munsell Renotation. Converting the recorded values to another color space often provides a more intuitive representation of color than native RGB or cyan-magenta-yellow-key (CMYK) color spaces.

The luminance and chrominance values for a particular position may then be used to construct a color gamut for that respective position. The color gamut comprises a three-dimensional space representing all colors producible in that region. Thus, each region measured will have an associated color gamut. In the 3×3 lattice depicted in FIG. 4, for example, nine color gamuts are created.

After color gamuts have been constructed for each of the measured positions, the colors common to all gamuts are then extracted in order to form a common color gamut. This is shown in block 306. In one embodiment, the common color gamut is formed as the intersection of all constructed color gamuts.

A target color gamut may then be defined based upon the common color gamut. In one embodiment, the target color gamut represents the range of colors that a point on the display screen will be able to output after the color connection.

Note that the target color gamut may be based upon one or more design preferences. For example, if uniformity across all positions on the display surface is desired, the target color gamut may be completely included within the common color gamut. In one embodiment, the shape of the target color gamut is selected to match a shape that is common to the constructed color gamuts. In another embodiment, the shape of the target color gamut is selected to match an ideal shape selected based upon one or more design preferences.

In some embodiments, the target color gamut is defined to be a certain percentage of the common color gamut. For example, in one embodiment, the target color gamut is defined to be 90% of all common color volumes. In other embodiments, the target color gamut is defined based upon colors common to only a portion of the screen. For example, in one embodiment, the target color gamut may comprise the colors common to 80% of the rectangle 406 depicted in FIG. 4.

The amount of error allowable in constructing the target gamut may depend in part upon the unevenness of the display. For example, if the unconnected display is significantly uneven in luminance and color, the amount of reduction necessary for mapping all points on the display surface to the common color gamut may be unacceptable. Thus, according to some embodiments, only a portion of the points on the display surface (or alternatively, a portion of the colors reproducible by these points) map within the common color gamut. In other embodiments, i.e., where there is a more even presentation of luminance and color on various regions of the display, the mapping of each point on the display surface may be completely included within the common color gamut.

After the target color gamut has been defined, luminance and chrominance values for each position on the screen may then be calculated based upon the values of measured positions. This is shown in FIG. 3 at block 310.

Figure 5:
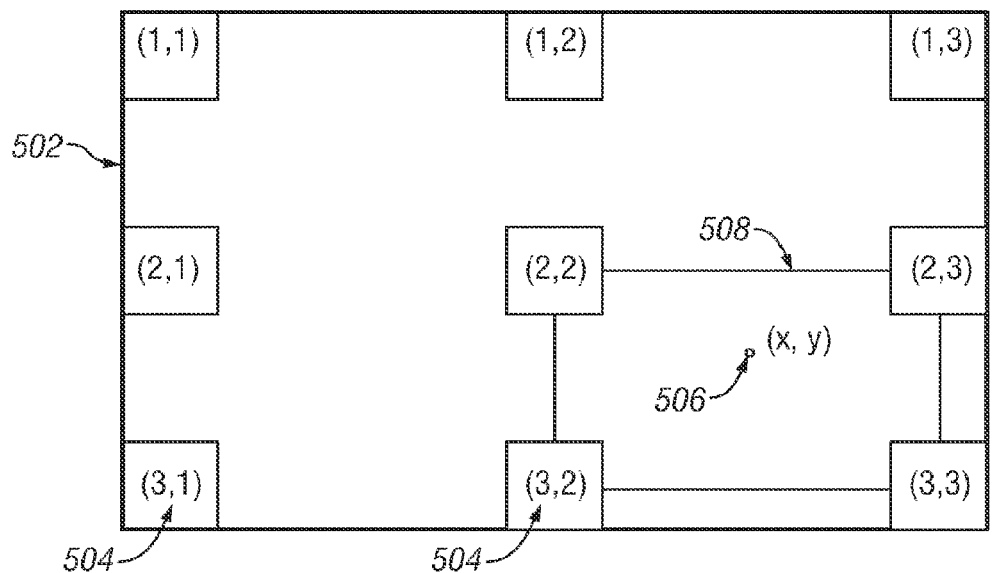
FIG. 5 is an illustration of an exemplary method of determining input for an interpolation process according to one embodiment of the present invention.

If the defined regions form a two-dimensional lattice (such as that depicted in FIG. 5), conventional techniques of bi-linear interpolation may be used to calculate the luminance and chrominance values for an arbitrary position 506 (x,y) on the display screen 502. In one embodiment, input to the bi-linear interpolation process is determined by finding a minimum rectangle defined by the measured positions 504 which contain the position 506 (x,y). For example, in FIG. 5, the minimum rectangle 508 comprising the position 506 (x,y) would be formed from the vertices at the measured positions 504 (2,2), (2,3), (3,2), and (3,3). Thus, the four color gamuts at each vertex of the minimum rectangle 508 are used for estimating the uncorrected color gamut at the location 506 (x,y).

If the regions were instead defined as triangles, conventional triangulation techniques may be used to find the triangle containing the (x,y) position. The uncorrected color gamut at the location (x,y) may then be estimated using conventional methods of triangular interpolation.

A color gamut may then be generated for each position (x,y) on the screen contained within the area of interpolation. In one embodiment, if the position (x,y) on the display screen falls outside of the area of interpolation (for example, with in the border region 408 of FIG. 4), the position (x,y) may be assigned a correction corresponding to the closest point contained within the area of interpolation (i.e., as defined by the rectangle 406).

Referring again to FIG. 3, each position (x,y) is then mapped to the target color gamut. This is shown in blocks 314 and 316. Conventional techniques of color gamut mapping may be used to achieve this mapping according to embodiments of the present invention. In one embodiment, each target color contained within the target color gamut has one or more colors in the uncorrected color gamut which map to that color. The process is then completed if there are no more positions on the screen to correct.

Figure 6:
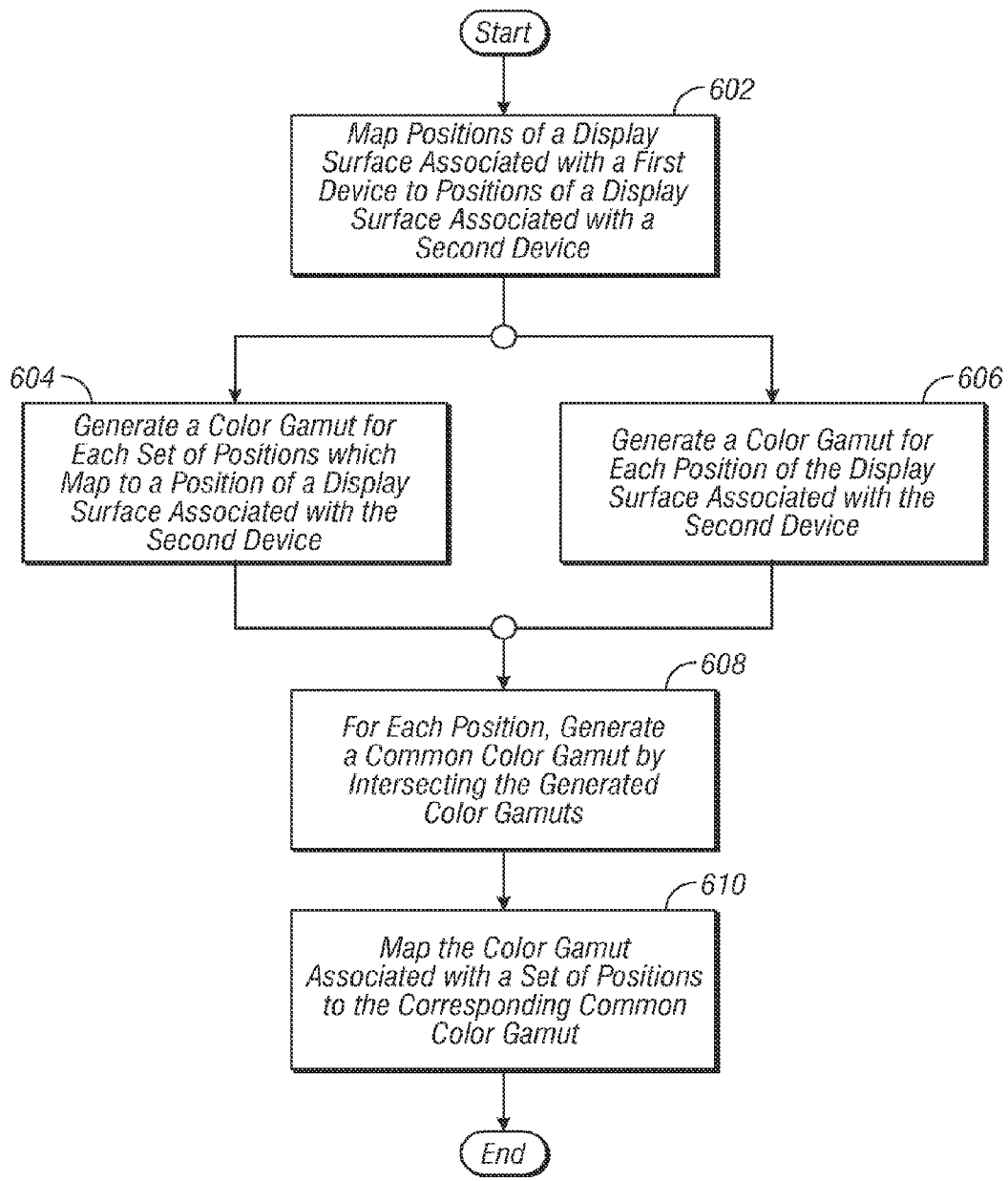
FIG. 6 is an illustration of an exemplary method of mapping a color set producible at one or more positions of a display surface associated with a first device to a color set producible at each position of a display surface associated with a second device according to one embodiment of the present invention.

Some embodiments of the present invention may be used to map a color set producible at one or more positions of a display surface associated with a first device to a color set producible at each position of a display surface associated with a second device. This may be useful, for example, in applications which attempt to simulate the output behavior of one display on another display. For instance, in one embodiment of the present invention, the colors of a MacBook Pro display may be simulated on a Cinema Display without requiring a MacBook Pro device to be present. FIG. 6 is an illustration of an exemplary method of accomplishing this mapping according to one embodiment of the present invention.

At block 602, positions of a display surface associated with a first device are mapped to positions of a display surface associated with a second device. In one embodiment, this is accomplished by a procedure adapted to scale one device area to another device area, but other techniques may be alternatively employed to accomplish the mapping according to embodiments of the present invention.

At block 604, a color gamut is generated for each set of positions which map to a position of a display surface associated with the second device. In some embodiments, this is accomplished by arranging the points on the display surface associated with the first device into a two-dimensional lattice or triangular area. Luminance and chrominance values may then be measured at designated positions on the display surface for a plurality of input color combinations. These luminance and chrominance values may then be used to construct color gamuts for each of the designated positions. Color gamuts for the remaining positions on the display surface may be determined by interpolating luminance and chrominance values from the measured positions.

In other embodiments, a device is used which can determine luminance and chrominance values by taking a snapshot or a picture of the entire display surface. The device may comprise a color calibrated camera or other component adapted to accurately measure luminance and chrominance values from the captured image. In one embodiment, the luminance and chrominance values for a particular color input sequence can be determined for all positions on the surface based upon a single snapshot. Color gamuts may then be constructed for each position without interpolation.

At block 606 a color gamut is generated for each position of the display surface associated with the second device. This may be accomplished using any of the methods described above with respect to block 604 (i.e., measurement and interpolation). Various other methods may also be used to generate the color gamuts according to embodiments of the present invention.

At block 608, a common color gamut is generated for each position by intersecting the color gamuts associated with each respective position. In one embodiment, the common color gamut represents a range of all colors producible within a set of positions of the display surface associated with the first device which are also producible within a corresponding position of the display surface associated with the second device.

At block 610, the color gamut associated with a set of positions is mapped to the corresponding color gamut. Conventional techniques of gamut mapping may be used to accomplish this mapping. Additionally, the gamut mapping process may be accomplished by any combination of software, firmware, and/or hardware.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A non-transitory program storage device, readable by a processor and comprising instructions stored thereon to cause one or more processors to:

obtain luminance and chrominance values for each of a first plurality of display regions of a display, wherein each display region includes one or more display positions;

determine a color gamut for each of the first plurality of display regions, wherein each such color gamut is based, at least in part, on the region's obtained luminance and chrominance values;

determine a common color gamut based, at least in part, on one or more of the first plurality of display regions' color gamuts;

determine a target color gamut based, at least in part, on the common color gamut;

determine a color gamut for each of a first plurality of display positions, wherein each such color gamut is based, at least in part, on two or more of the obtained luminance and chrominance values;

map one or more of the color gamuts of the first plurality of display positions to the target color gamut; and use the target color gamut to generate a uniform color display at at least two display positions on the display.

2. The non-transitory program storage device of claim 1, wherein the instructions to cause the one or more processors to obtain luminance and chrominance values for each of a first plurality of display regions comprise instructions to cause the one or more processors to:

present a plurality of color input sequences to a display, the display having a first plurality of display regions, wherein each display region includes one or more display positions; and obtain separate luminance and chrominance values for each of the first plurality of display regions for each of the plurality of color input sequences.

3. The non-transitory program storage device of claim 2, wherein the instructions to cause the one or more processors to determine a color gamut for each of the first plurality of display regions comprise instructions to cause the one or more processors to combine, for each of the first plurality of display regions, two or more of the separate luminance and chrominance values obtained for the display region to determine a color gamut.

4. The non-transitory program storage device of claim 1, wherein each of the first plurality of display regions comprise a rectangular array of display positions.

5. The non-transitory program storage device of claim 1, wherein the number of display positions in any given display region is small compared to the total number of display positions of the display.

6. The non-transitory program storage device of claim 1, wherein the instructions to cause the one or more processors to determine a common color gamut comprise instructions to cause the one or more processors to select at least some of the colors that are common to all of the first plurality of display regions' color gamuts.

7. The non-transitory program storage device of claim 1, wherein the instructions to cause the one or more processors to determine a target color gamut comprise instructions to cause the one or more processors to select a specified portion of the colors that are common to all of the first plurality of display regions' color gamuts.

8. The non-transitory program storage device of claim 1, wherein the instructions to cause the one or more processors to determine a color gamut for each of a first plurality of display positions comprise instructions to cause the one or more processors to:

determine luminance and chrominance values for each of a first plurality of display positions, wherein each such luminance and chrominance value is based, at least in part, on two or more of the obtained luminance and chrominance values; and determine a color gamut for each of the first plurality of display positions based, at least in part, on each of the first plurality of display position's luminance and chrominance values.

9. The non-transitory program storage device of claim 8, wherein the instructions to cause the one or more processors to determine luminance and chrominance values for each of a first plurality of display positions comprise instructions to cause the one or more processors to:

identify a first number of the display regions;

adopt a location within each of the first number of display regions and associate each region's obtained luminance and chrominance values with that adopted location;

identify an area enclosed by a bounding box that connects each adopted location;

determine luminance and chrominance values for each display position within the identified area; and select at least a second number of the display regions and repeat the instructions to cause the one or more processors to adopt a location, identify an enclosed area, and determine luminance and chrominance values for each display position within the identified area.

10. The non-transitory program storage device of claim 9, wherein the instructions to cause the one or more processors to determine luminance and chrominance values for each display position within the identified area comprise instructions to cause the one or more processors to:

select a first display position within the identified area;

determine luminance and chrominance values for the first display position based on the luminance and chrominance values of at least two of the adopted locations; and repeat the instructions to cause the one or more processors to select a display position and interpolate for all the display positions within the identified area except the first display position.

11. The non-transitory program storage device of claim 10, wherein the instructions to cause the one or more processors to determine luminance and chrominance values for the first display position based on the luminance and chrominance values of at least two of the adopted locations comprise instructions to cause the one or more processors to interpolate luminance and chrominance values for the first display position from the luminance and chrominance values of the at least two of the adopted locations.

12. A non-transitory program storage device, readable by a processor and comprising instructions stored thereon to cause one or more processors to:

map a first set of positions on a first display surface of a first display to second positions on a second display surface of a second display;

generate a color gamut for each of the first set of positions;

generate a color gamut for each of the second set of positions;

generate a common color gamut for each of the first and second sets of positions based, at least in part, on the color gamuts for the first and second sets of positions;

receive color information for the first display;

use the common color gamut to convert the color information for the first display into color information for the second display; and cause the color information for the second display to be displayed on the second display.

13. A non-transitory program storage device, readable by a processor and comprising instructions stored thereon to cause one or more processors to:

obtain luminance and chrominance values for each of a first plurality of display regions of a display, the display having a first plurality of display positions, wherein each display region includes one or more display positions;

determine a color gamut for each of the first plurality of display regions, wherein each such color gamut is based, at least in part, on the region's obtained luminance and chrominance values;

determine a common color gamut based, at least in part, on one or more of the first plurality of display regions' color gamuts;

determine a target color gamut based, at least in part, on the common color gamut;

determine luminance and chrominance values for each of a second plurality of display positions, wherein each such luminance and chrominance value is based, at least in part, on two or more of the obtained luminance and chrominance values;

determine a color gamut for each of a third plurality of display positions, wherein each such color gamut is based, at least in part, on the corresponding display position's luminance and chrominance values;

map one or more the third plurality of color gamuts to the target color gamut; and use the target color gamut to generate a uniform color display at least to display positions on the display.

* * * * *